United States Patent [19]
Peters, Jr.

[11] 3,803,946
[45] Apr. 16, 1974

[54] GEAR TRANSMISSION
[75] Inventor: Charles L. Peters, Jr., Anaheim, Calif.
[73] Assignee: Box Innards, Inc., Anaheim, Calif.
[22] Filed: Dec. 18, 1972
[21] Appl. No.: 315,800

[52] U.S. Cl. ................................................. 74/745
[51] Int. Cl. ............................................. F16h 3/02
[58] Field of Search..................... 74/745, 349, 342

[56] References Cited
UNITED STATES PATENTS
2,199,834  5/1940  Groene et al. .................... 74/745 X
2,375,602  5/1945  Wickham .......................... 74/745 X

FOREIGN PATENTS OR APPLICATIONS
591,163  6/1925  France ................................. 74/745

*Primary Examiner*—Leonard H. Gerin
*Attorney, Agent, or Firm*—Perry E. Turner

[57] ABSTRACT

Within a sealed housing, each of two pairs of plates carries upper and lower gears in mesh, the upper gears being slidable on and rotatable with a respective idler shaft, such shafts being parallel to and above an idler shaft on which are fixed a plurality of gears wherein each has a different number of teeth than the rest. The plate pairs are rotatable on their shafts to swing away from and toward the lower shaft, and are independently movable via a chain and sprocket to be selectively positioned adjacent any of the plurality of gears. Cams are provided to move the plate pairs inwardly so that their lower gears mesh with those of the plurality of gears adjacent which they are positioned. An input shaft is adapted to drive one of the upper idler shafts, and the other of such shafts is adapted to drive an output shaft, via gear couplings formed of longitudinally shiftable gears which are selectively positioned to effect any of a plurality of ratios between the coupled shafts. Via other shiftable gears between the output shaft and the driving idler shaft, and between the input shaft and a further output shaft, the input shaft is adapted to drive either output shaft at a fixed ratio and effect operation of the other output shaft at any of a plurality of ratios via the longitudinally shiftable gears and those of the plurality of gears and lower gears meshed therewith. Control elements for moving the chain and operating all shiftable gears are located at the front of the housing.

11 Claims, 10 Drawing Figures

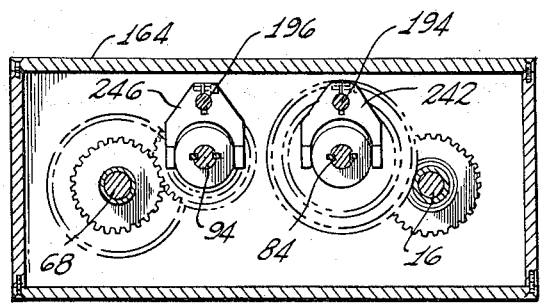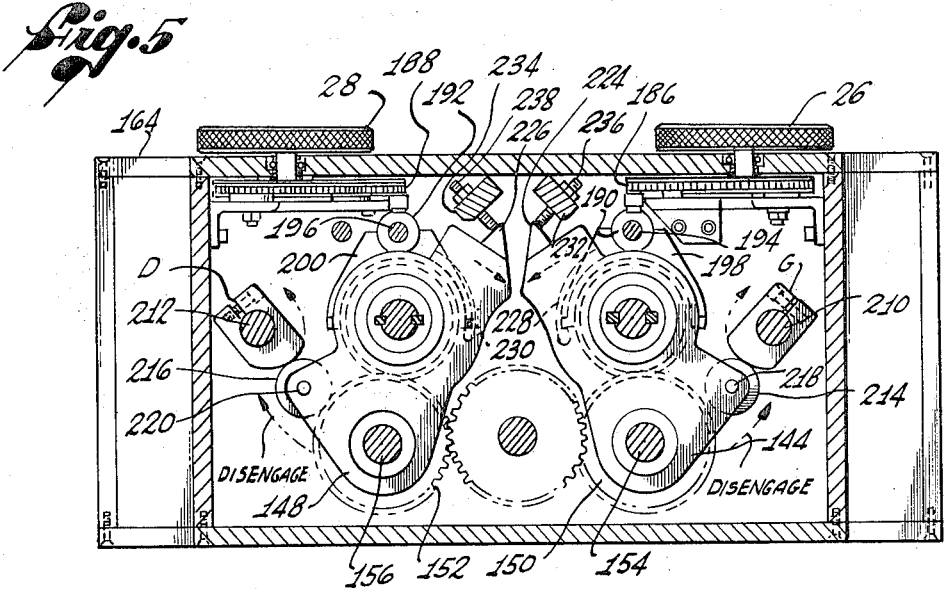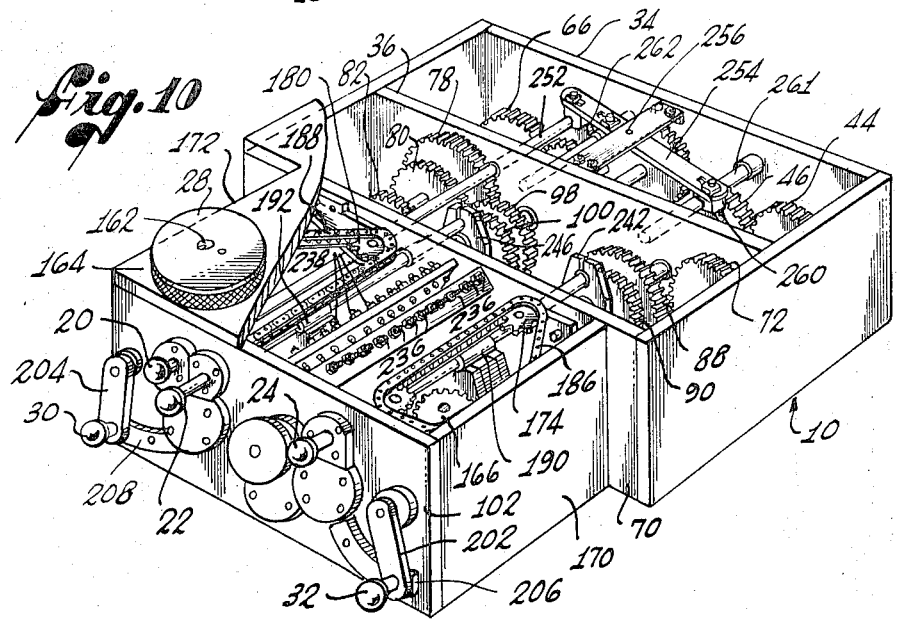

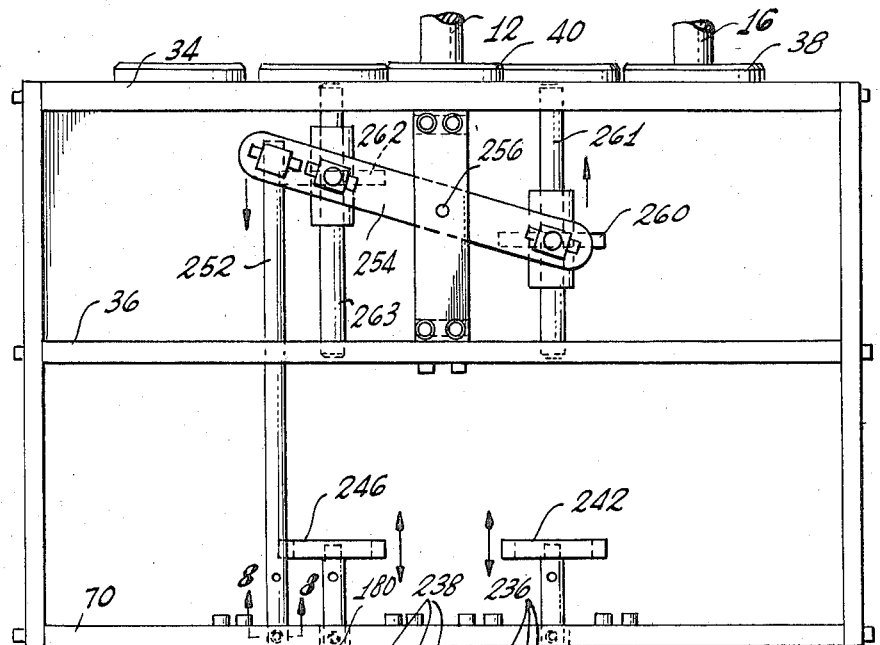
Fig. 6
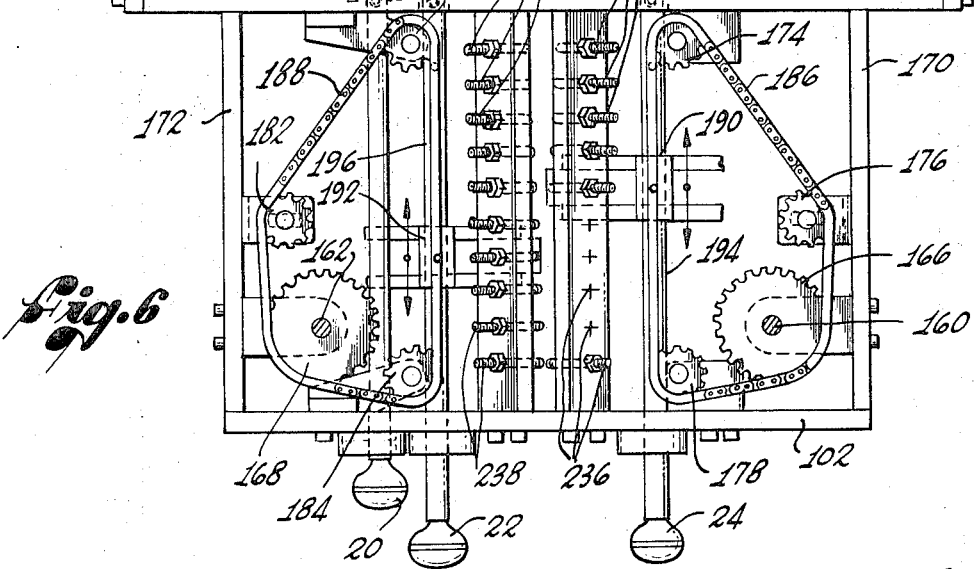
Fig. 8
Fig. 9

GEAR TRANSMISSION

BACKGROUND OF THE INVENTION

1. Field of the Invention

This invention relates to gear transmissions for effecting a variety of ratios for the relative speeds between a pair of output shafts driven from a common input shaft.

2. Description of the Prior Art

Standard transmissions are available with which to select among a number of ratios for the relative speeds of a pair of output shafts. Such a transmission typically has a number of gears on an input shaft, one of which is used to effect a fixed ratio or reduction for one output shaft. For the other output shaft, any of a limited number of ratios are made possible by means of ganged gears which are movable parallel to the input shaft so that one of the ganged gears meshes with one of the gears on the input shaft. Such ganged gears may be used in combinations on different idler shafts, so that they can be moved relative to each other to cause respective gears thereof to mesh. With such ganged gears coupled to the other output shaft, that shaft can be operated at any of a number of speeds relative to the input shaft, to the end that different apparatus driven by the two output shafts can be coordinated.

In a typical arrangement, one output shaft may drive a paper roller, and the other may operate a cutter. By changing the gear ratios, sheets of different lengths may be cut as desired. Available transmissions for such purposes are adapted to provide nine ratios. Of course, such ganged gears may be made with any desired number of gears to obtain a larger number of ratios. However, the design and structure of such transmissions become exceedingly complex when larger numbers of ratios are attempted. Correspondingly, such transmissions as designed for a relatively small number of ratio possibilities, e.g., up to 64, are extremely expensive items which may cost in the tens of thousands of dollars. Furthermore, the ratios are fixed, i.e., it is not possible to obtain ratios intermediate those designed for, and they are altogether unsuited for operating different apparatus in synchronism in any of many conditions requiring many hundreds of ratios between the two output shafts.

For example, in machinery for making partitions for insertion in boxes to provide individual cells to receive articles to be separated and protected, each strip-forming apparatus must form and feed a number of notched strips to an assembly station. Parallel strips from one apparatus are moved onto a platform at the assembly station, where they are supported on edge. From the other apparatus, strips are moved over the platform at right angles to the strips thereon, and moved down to be interlocked with them. As the completed multi-cell partitions are moved off the assembly station, the next is being formed.

An appreciation of the immensity of the problem facing such a partition manufacturer can be realized by considering the vast number of variables to be faced in arranging for successive production runs wherein the numbers of strips must be varied. For example, to be prepared to manufacture partitions ranging from four to many hundreds of cells, one cannot fill orders with the use of known gear transmissions, because the vast number of ratios required cannot be realized with them.

A further appreciation of the problems of such a manufacturer can be realized by considering the number of strip arrangements for forming partitions with the same number of cells. For example, a 24-cell partition may be formed with one long strip from one apparatus and eleven from the other, or two long strips from one apparatus and seven from the other, or three strips from one apparatus and five from the other. Also, the sizes of such cells of equal number may be varied, thus making it necessary to provide strips of differing lengths and widths. For successive production runs for any two such examples, it is necessary to operate the different apparatus at different speeds than in the previous run, and to coordinate their operations so that the partitions are correctly formed. Each such run requires a different ratio between the two output shafts than was required for the previous run.

It has been known to achieve a greater number of ratios than is obtainable with standard transmissions by the use of changeable gear belts and pulleys. Such changes as are needed must be made quickly, as machine down time must be kept to a minimum in order to maintain a going business. However, it is not possible with known arrangements to effect such a change in less than ten to fifteen minutes. Further, the number of ratio changes possible by such means is limited so that one is forced to standardize and is therefore prevented from filling orders for products for which the needed ratio needs are not available. Over the period of a year, such limitations can amount to many thousands of dollars of lost income.

SUMMARY OF THE INVENTION

This invention embraces a multiple ratio transmission wherein the upper of two pairs of upper and lower meshed gears are slidable on and robatable with parallel shafts so as to be independently positioned with the lower gears in mesh with any of a plurality of gears fixed on an idler shaft, one of such parallel shafts being driven from one shaft, and the other of such parallel shafts being adapted to drive another shaft. Also embraced is a ratio multiplier wherein a variable ratio transmission is coupled to said parallel shafts. Further, this invention embraces an input shaft for driving the one parallel shaft, and a pair of output shafts, together with shiftable gear means for selecting which output shaft is driven from the other parallel shaft and which is driven at a fixed ratio from the input shaft.

BRIEF DESCRIPTION OF THE DRAWINGS

FIG. 4 is a sectional view taken along the line 4—4 of FIG. 2;

FIG. 5 is a sectional view taken along the line 5—5 of FIG. 2;

FIG. 6 is a plan view of portions of the transmission taken along the line 6—6 of FIG. 3;

FIG. 8 is a fragmentary sectional view taken along the line 8—8 of FIG. 6;

FIG. 9 is a fragmentary view in perspective of the back of the housing from which the input and both output shafts extend; and FIG. 10 is a perspective view of the housing from the front thereof, with the top plate broken away to show portions of the transmission.

DESCRIPTION OF PREFERRED EMBODIMENT

Figure 1:
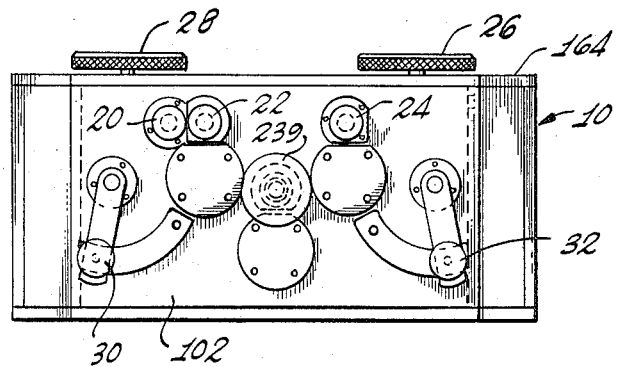
FIG. 1 is a front elevation view of the housing of the transmission of this invention, showing the positions of all controls for effecting gear ratio changes in a matter of seconds.
Figure 2:
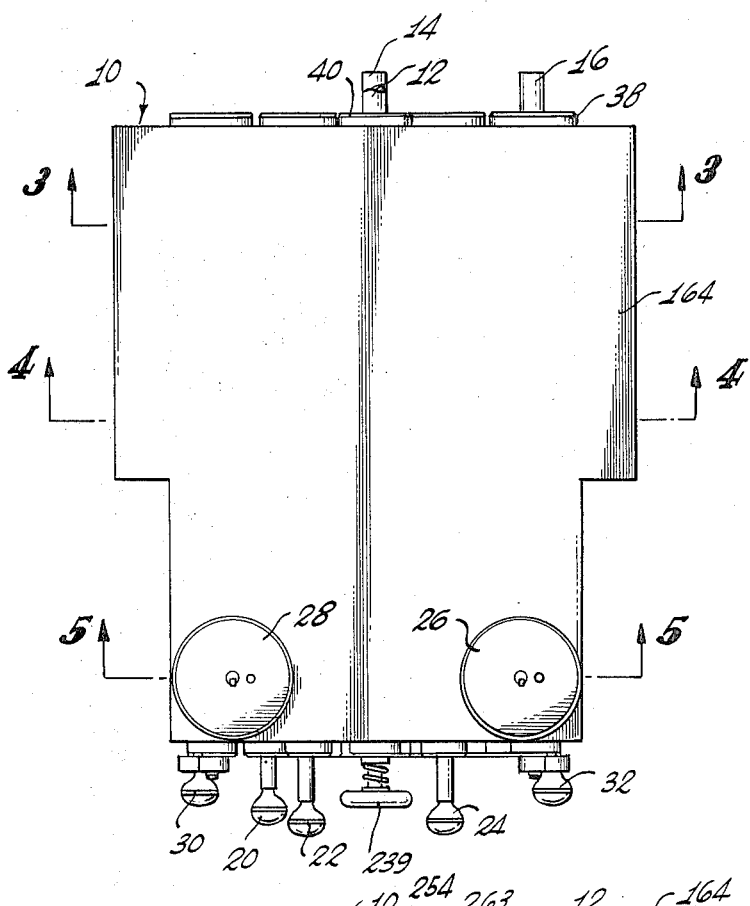
FIG. 2 is a top plan view of the housing.

Front, top and back views of a housing 10 for a gear transmission of this invention are shown in FIGS. 1, 2 and 9. Extending from the back of the housing are a pair of output shafts 12, 14 and an input shaft for operating them via different portions of the transmission. The input shaft preferably is operated by a variable speed motor (not shown), and the output shafts operate respective apparatus (not shown), the functions of which must be coordinated.

Manually operable control elements at the front of the housing are used to establish any one of hundreds of ratios for the relative speeds of the output shafts. The input shaft 16 drives one or the other of the output shafts at a fixed ratio relative thereto, depending upon the position of a push-pull knob 20. The output shaft that is not driven at such fixed ratio is rotatable via one of a plurality of gear couplings selected by push-pull knobs 22, 24 and by rotatable knobs, shown as knurled discs 26, 28, operable in conjunction with detent knobs 30, 32. The housing is oil-tight, and any of the numerous ratios for the output shafts is selectively set without any need to open the housing for such purpose and risk loss or contamination of oil and damage to immersed parts.

Figure 7:
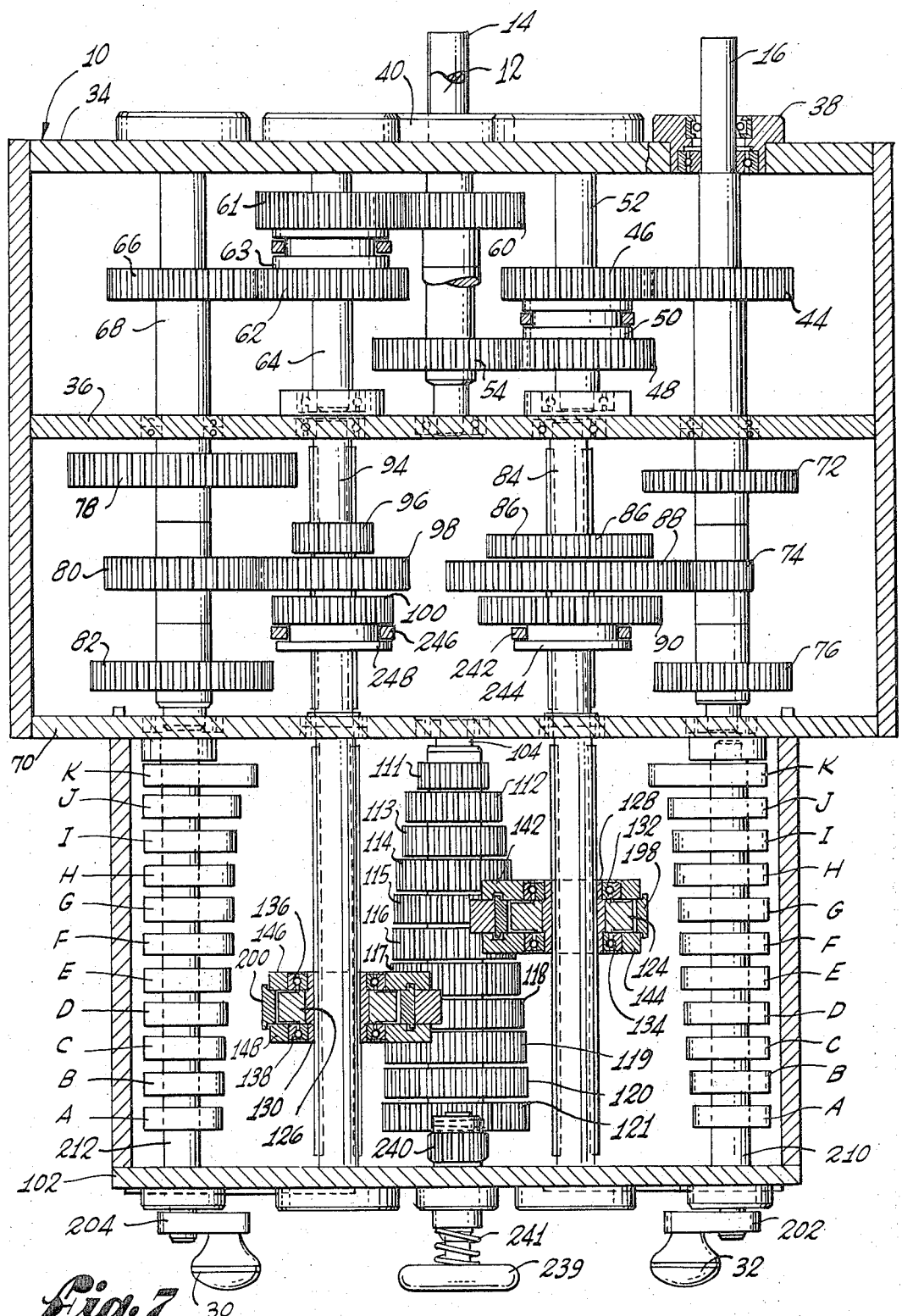
FIG. 7 is a sectional view taken along the line 7—7 of FIG. 3.

As best seen in FIGS. 7 and 9, the shafts 12, 14, 16 extend through the back plate 34 of the housing, the shafts 12, 14 extending to a plate 36 and the shaft 16 extending through the plate 36. The three shafts extend through oil seals 38, 40, 42 secured to the back plate, and are rotatable in bearings in the oil seal cups and in bearings in the plate 36. A gear 44 is fixed on the input shaft 16, and is adapted to be engaged by either of a pair of gears 46, 48 fixed to a hub 50 that is slidable on an idler shaft supported in bearings in the plates 34, 36. Preferably, all rods and shafts which extend to or through the housing are supported at such points in bearings carried in oil seals.

In the positions shown in FIG. 7, the input shaft 16 drives the bottom output shaft 14 via gears 44, 46, 48 and a gear 54 fixed on the output shaft 14. In this case, the output shaft 12 is operated via the multiple ratio transmission. To this end, the output shaft 12 carries a gear 60 that is adapted to be meshed with one of a pair of spaced gears 61, 62 on a hub 63 that is slidable on an idler shaft 64 which is rotatable in bearings in the plates 34, 36. In the positions shown, the gears 60, 61 are in mesh, and the gear 62 is meshed with a gear 66 fixed on a shaft 68.

As with the input shaft 16, the shaft 68 is rotatable in bearings in the plates 34, 36. Further, both shafts 16, 68 extend through the plate 36 and have their ends rotatable in bearings in a plate 70. Between the plates 36, 70, spaced gears 72, 74, 76 are fixed on the input shaft 16, and spaced gears 78, 80, 82 are fixed on shaft 68. Via one of the gears 72, 74, 76, the input shaft 16 is adapted to drive a shaft 84 that is rotatable in bearings in plates 36, 70. The shaft 84 carries spaced gears 86, 88, 90 that are slidable on and rotatable therewith.

A similarly arranged shaft 94 has spaced gears 96, 98, 100 slidable thereon and rotatable therewith. Via one of the gears 96, 98, 100 meshing with one of the gears 78, 80, 82, the shaft 68 is driven from the shaft 94, thereby to operate the upper output shaft 12.

The shafts 84, 94 are coupled via transmission means located between the plate 70 and the front plate 102 of the housing. Such transmission includes a shaft 104 rotatable in bearings in plates 70, 102, and on which are fixed a plurality of gears 111–121 of equal pitch but different numbers of teeth. Referring to FIG. 5–7, the shafts 84, 94 carry gears 124, 126 that are slidable on and rotatable therewith. In the illustrated arrangement, the gears 124, 126 are press fit on the centers of hubs 128, 130 which are slidable on and rotatable with the shafts 84, 94. Pressed onto the ends of the hubs 128, 130 are the inner races of respective pairs of ball bearings 132, 134 and 136, 138. The inner races abut the gears between them, but the outer races do not. The bearing pairs 132, 134 and 136, 138 are located in openings in respective pairs of plates 142, 144 and 146, 148, with which the outer races of respective ones of the bearings are in press fit engagement.

In FIG. 5, other respective gears 150, 152 are shown supported by the plate pairs 142, 144 and 146, 148 below and in mesh with the gears 124, 126. The gears 150, 152 are press fit on the centers of respective stub shafts 154, 156, seen in end view in FIG. 5, and as with the gears 124, 126 they are located between ball bearings which have their inner races press fit on the stub shafts 154, 156 and their outer races press fit in the associated plates of the pairs 142, 144 and 146, 148. Thus, the assemblies of plate pairs, gears and bearings are independently movable along the shafts 84, 94 to permit the gears 150, 152 to be meshed with any of the gears 111–121.

In operation at a given speed of rotation of the shaft 84, the gear 150 (via gear 124) effects rotation of the shaft 104 at a speed depending upon which of the gears 111–121 it engages. In turn, the shaft 94 is operated at a speed depending upon which of the gears 111–121 is meshed with the gear 152.

Longitudinal movement of the gears 124, 126 is achieved by turning the knobs 26, 28. In the preferred arrangement, one revolution of either knob 26, 28 causes the associated plate pair, gear and bearing assembly to traverse all of the gears 111–121. For this purpose, and referring to FIGS. 5, 6 and 10, the knobs 26, 28 are mounted on pins 160, 162 which are rotatable in the top plate 164 of the housing, and have their inner ends secured to sprockets 166, 168.

The sprockets 166, 168 are above and outboard of the shafts 84, 94. Secured to plates 70, 102 and the sides of the housing at the same level are brackets for idler sprockets 174, 176, 178 and 180, 182, 184. Chains 186, 188 are placed around the respective sets of sprockets, which are positioned so the portions of the chains extending between the inboard sprockets are above the shafts 84, 94 and parallel to them.

Such chain portions are secured to respective collars 190, 192 slidable on rods 194, 196 which are above and parallel to the shafts 84, 94. Such collars are integral with respective fork elements 198, 200 which have arms that are located between and slidable relative to the pairs of plates 142, 144 and 146, 148. Thus, the gears 124, 126 and such plate pairs are rotatable relative to each other and to the associated forks. Also, the gears 150, 152 are angularly movable toward and away from the shaft 104 and the gears 111-121 thereon. Such angular movement permits the gears 150, 152 to be swung out clear of the gears 111-121 as the knobs 26, 28 are turned to position the gears 150, 152 for meshing engagement with desired ones of the gears 111-121.

In this latter regard, cam means are provided to hold the gears 150, 152 in mesh with those gears 111-121 selected via the knobs 26, 28. Referring to FIGS. 5, 7 and 10, the lock knobs 30, 32 are on the ends of crank arms 202, 204 which engage wear plates 206, 208, and are fixed to shafts 210, 212 which are rotatable in bearings in the housing wall plates 70, 102. Fixed to each of the shafts 210, 212 are a plurality of cam elements A-K aligned with respective ones of the gears 111-121. When the knobs 30, 32 are moved to the outer ends of the wear plates 206, 208, the cams are rotated down. Moving the knobs 30, 32 to the inner ends of the wear plates rotates the cams upwards.

The plate pairs 142, 144 and 146, 148 carry bearing elements 214, 216 rotatable on pins 218, 220, such bearing elements being engageable by the cam elements A-K. When the cam shafts 210, 212 rotate the cams down, the cams aligned with gears 150, 152 engage the bearings 214, 216 and thereby hold the plate pairs in so the gears 150, 152 are maintained in mesh with respective ones of the gears 111-121 with which they are aligned via knobs 26, 28.

When the cams are rotated up, the gears 150, 152 are disengaged from the gears 111-121 meshed thereby. The knobs 26, 28 can then be rotated to position the gears 150, 152 opposite others of the gears 111-121, whereupon downward rotation of the cams causes respective cams to engage the bearing elements 214, 216 and hold the gears 150, 152 in mesh with the newly selected ones of the gears 111-121. The knobs 30, 32 are preferably adapted to be releasably locked in either extreme position, as by means (not shown) that are readily apparent to skilled mechanics.

To aid in disengaging the gears 150, 152 when the cams A-K are rotated up, the plate pairs are preferably suitably weighted. Referring to FIGS. 5 and 7, weights 224, 226 are placed between and secured to the plate pairs at their upper ends, which are inboard of the shafts 84, 94. When the cams are moved clear, the weights cause the plate pairs and gears and bearings therein to rotate out so the gears 150, 152 move clear of the gears 111-121. To aid this action, the plate pairs may be made of lightweight aluminum and the weights of much heavier metals such as hardened steel, tungsten or the like.

To facilitate their angular movement, the confronting surfaces of the plates of the pairs 142, 144 and 146, 148 are provided with curved grooves 228, 230 (see FIG. 5), and the arms of the forks 198, 200 terminate in lips that extend into the grooves (see FIG. 7). Thus, the plate pairs are effectively interlocked with the forks in such a way as to minimize surface contact and attendant friction between them.

The weights 224, 226 are also incorporated in means to limit the innermost positions of the gears 150, 152. In this connection, the cams A-K are appropriately dimensioned to force the plate pairs inwardly and insure that the gears 150, 152 will positively mesh with those of the gears 111-121 with which they are aligned. However, tolerances may be such that undue force is exerted by the cams so as to cause the meshed gears to bind. Referring to FIGS. 5, 6 and 10, this prospect is avoided by means of a pair of bars 232, 234 mounted on the plates 70, 102 and a plurality of set pins 236, 238 threaded through such bars. As best seen in FIG. 5, the pins 236, 238 are adjusted so their inner ends are engaged by the weights 224, 226 in the innermost positions of the plate pairs needed to insure proper meshing of the gears 150, 152 with the selected gears 111-121. Thus, the pins are limit stops to prevent undesired binding of meshed gears.

Also provided is means to facilitate proper meshing of the gears in the event of edge abutment of teeth of gears to be meshed. As best seen in FIG. 7, a hand wheel 239 extends through the front plate 102 and carries a small gear 240 of the same pitch as the gears 111-121. The hand wheel is normally biased outwards via a spring 241 so the gear 240 is clear of the gear 121. Pushing the hand wheel causes the gear 240 to mesh with the gear 121, whereupon turning the hand wheel rotates the gears 111-121 so as to move aligned gears out of edge abutment and permit the associated gear 150 or 152 to be cammed into mesh with the gear it is aligned with.

The rods 194, 196 on which the collars 190, 192 ride are used in the illustrated arrangement to position the ganged gears 86, 88, 90 and 96, 98, 100. The rods 194, 196 extend through the front plate 102 where the knobs are fixed on their outer ends, and through the plate 70. Fixed on the inner end of the rod 194 is a fork 242, the arms of which are located between the gear 90 and a flange 244 integral therewith. In similar fashion, a fork 246 fixed on the inner end of the rod 196 is located between the gear 100 and a flange 248 that is integral therewith.

Thus, via the knob 22 the rod 194 is pushed or pulled to be placed at an innermost position to bring the gear 86 in mesh with the gear 72, and outermost position in which the gear 90 is brought in mesh with gear 76, and an intermediate position in which the gears 88 and 74 are meshed. Similarly, via the knob 24 the rod 196 is movable to an innermost position at which the gears 96, 78 are meshed, an intermediate position to mesh gears 98, 80, and an outer position to mesh gears 100, 82. As will now be apparent, manipulation of the hand wheel 239 is also effective to permit proper meshing of the gears on the rods 194, 196 and the shafts 16, 68.

Figure 3:
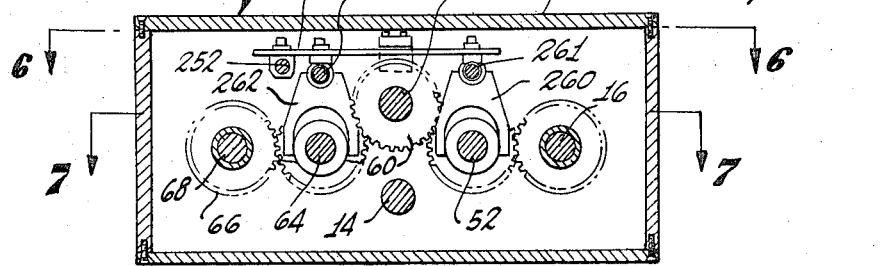
FIG. 3 is a sectional view taken along the line 3—3 of FIG. 2.

As previously mentioned, the input shaft 16 is adapted to drive either of the output shafts at a fixed ratio. Referring to FIGS. 3, 6 and 10, the knob 20 is on the outer end of a rod 252 that extends through plates 102, 70, 36. The inner end of the rod 252 is fixed to one end of a bar 254 that is pivoted at 256 to a bar 258 secured to the plates 34, 36. Carried by the bar 254 on one side of the pivot is a fork 260 that rides on a pin 261 extending between the plates 34, 36. Also carried by the bar 254 between its pivot and the rod 252 is a fork 262 that is slidable on a pin 263 extending between the plates 34, 36.

The forks 260, 262 fit into grooves in the hubs 50, 63 on which the gears 46, 48 and 61, 62 are carried. Via the knob 20, the rod 252 is adapted to be pushed to the inner position shown in FIG. 6, and pulled to an outer position, the position of such rod determining which output shaft is to be driven at the fixed ratio by the input shaft.

Preferably the various rods 194, 196, 252 are adapted to be indexed to their respective positions. FIG. 8 shows plate 70 provided with a small bore in which a ball 270, via a compression spring 272 and set screw 274, is urged against the rod to seat in a dimple therein. With spaced dimples in the rod corresponding to the positions of the forks thereon, the operator can readily determine when the rod is in any of its selected positions. The knobs 26, 28 are also similarly indexed. Also, of course, visual aids are used to help the operator in setting the various controls. Thus, the knobs 26, 28 are appropriately lettered or numbered for the various positions for the gears 150, 152. Also, the rods 194, 196, 252 preferably have appropriate markings to indicate the different positions for the forks moved by them.

An appreciation of the great variety of available ratios between the two output shafts will be seen from a transmission built as above described. In such example, each of the gears between the plates 34, 36 is a 10-pitch gear with 48 teeth. Between the plates 36, 70, each of the gears 72, 86 is a 12-pitch, 63-tooth gear, and all the rest are 10-pitch gears wherein gears 74, 78 are 21- and 84-tooth gears; gears 76, 90 are 45- and 60-tooth gears; gears 78, 96 are 75- and 25-tooth gears; gears 80, 98 are both 50-tooth gears; and gears 82, 100 are respective 60- and 40-tooth gears.

Between the plates 70, 102, all gears are 10-pitch gears wherein gears 124, 126 are 36-tooth gears; gears 150, 152 are 48-tooth gears; and gears 111–121 are respective 24-, 34-, 36-, 38-, 39-, 40-, 42-, 44-, 45-, 46- and 48-tooth gears. With these eleven gears, one hundred ten different ratios are available via the selective positioning of the gears 150, 152 in mesh with the gears 111–121. Further, the gear ratio combinations with such gears 111–121, 150, 152 constitute a ratio multiplier for the ratios available by selective positioning of the gears in the space between the plates 36, 70. In fact, this invention embraces the use of such a multiplier as an attachment to the output shafts of a standard variable ratio transmission.

In the arrangement illustrated and described, eight different ratios are available with the gear shifting provided between plates 36, 70. Thus, the entire transmission provides 880 different ratios. To change gear ratios for the entire transmission, an operator needs only to refer to a chart showing the positions for the knobs 20, 22, 24, 26, 28, all of which can be selectively positioned as needed in less than a minute.

Further, by varying the speed of the input shaft 16, the operations of the apparatus driven from the output shafts are subjected to a wide range of speeds for each gear ratio selected. In the transmission built as above described, a variable speed motor rotates the input shaft at any selected speed in the range 500–2,600 rpm.

We claim:
1. In combination:
    a housing;
    an idler shaft in said housing;
    a number of gears of equal pitch fixed on said idler shaft,
        each gear having a different number of teeth from any of the other gears;
    two pairs of upper and lower gears in mesh,
        said upper and lower gears of both pairs being of said equal pitch;
    a pair of shafts parallel to said idler shaft,
        each upper gear being slidable on and rotatable with a respective one of said parallel shafts;
    means for independently moving said upper gears along their shafts to position the associated lower gears adjacent any of the gears on said idler shaft; and
    means for holding each lower gear in mesh with the gear on the idler shaft adjacent which such lower gear is positioned.

2. The combination of claim 1, including
    means to effect rotation of one of said parallel shafts, whereby the other of said parallel shafts is rotated by operation of the lower gears and the gears on the idler shaft meshed therewith;
    and an output shaft extending from said housing and coupled to said other of said parallel shafts to be driven thereby.

3. The combination of claim 2, including a second output shaft extending from said housing;
    an input shaft extending into said housing and forming part of said means to effect rotation of said one of said parallel shafts;
    and gear means coupling said input shaft and said second output shaft to effect operation of said second output shaft at a predetermined fixed ratio relative to said input shaft.

4. The combination of claim 3, including shiftable gear means for selectively coupling said input shaft to one or the other of said output shafts;
    and means for coupling the output shaft that is not coupled to the input shaft to said other of said parallel shafts.

5. The combination of claim 1, wherein each gear moving means includes: a pair of plates between which the meshed upper and lower gears are rotatably supported;
    a collar slidable on the associated one of said parallel shafts;
    a fork secured to said collar and having arms extending between said pair of plates,
        the ends of said arms being disposed over the upper gear but in non-touching relation,
        said ends being in slidable engagement with said plates;
    and means engaging said collar and adapted to move said collar and fork, and hence said plates and meshed upper and lower gears, to position said lower gear adjacent any one of said gears on said idler shaft.

6. The combination of claim 5, wherein said means engaging said collar includes a chain to which the collar is attached,
    said chain being provided with a sprocket drive and support wherein spaced sprockets are positioned so that the portion of the chain to which said collar is attached is parallel to the shaft on which said collar is slidable;
    and a manually rotatable knob secured to one of said sprockets and located on the exterior of said housing,
        whereby rotation of said knob effects movement of said collar and fork, and hence the upper and lower meshed gears, along such one parallel shaft.

7. The combination of claim 1, including an input shaft and a pair of output shafts extending through a wall of said housing,
each of said shafts having a respective gear fixed thereon;
a pair of idler shafts each having a pair of gears movable in unison therealong;
means to effect rotation of one of said parallel shafts by said input shaft;
a further shaft having a gear fixed thereon;
means to effect rotation of said further shaft by the other of said parallel shafts;
and means for simultaneously moving said pairs of gears on said pair of idler shafts to one position wherein one pair operates one output shaft from said input shaft and the other pair operates the other output shaft from said further shaft, and to a second position wherein said one pair operates said other output shaft from said input shaft and said other pair operates said one output shaft from said further shaft.

8. The combination of claim 7, wherein said means to effect rotation of said one parallel shaft by said input shaft includes a number of gears fixed on said input shaft;
a number of gears slidable in unison on said one parallel shaft to different positions wherein a respective gear thereof meshes with a respective gear of said number of gears fixed on said input shaft.

9. The combination of claim 8, wherein said means to effect rotation of said further shaft by said other of said parallel shafts includes a number of gears slidable in unison on said other parallel shaft;
and a number of gears fixed on said further shaft, said gears slidable in unison on said other parallel shaft being movable to different positions wherein a respective gear thereof meshes with a respective gear of said number of gears fixed on said further shaft.

10. The combination of claim 5, wherein the upper ends of said pairs of plates are inboard of said parallel shafts,
said pairs of plates being weighted so that the holding means when not holding the lower gears in mesh with one of the gears on said idler shaft permits the lower gears to be moved angularly and clear of the gears on said idler shaft;
and means in each position of each pair of upper and lower gears engaging said pairs of plates to limit the inner positions of the lower gear so as to prevent said holding means from exerting such force as to cause the lower gear to bind with the one of the gears on said idler shaft with which it meshes.

11. The combination of claim 10, wherein said holding means includes cam means;
each pair of plates having a bearing element rotatable therebetween in a position outboard of the associated lower gear,
said cam means including a respective cam element for each position of said upper and lower gears operable to engage said bearing element to force said pair of plates inward to effect meshing of said lower gear with one of the gears on said idler shaft.

* * * * *